US006703470B2

(12) United States Patent
Konno et al.

(10) Patent No.: US 6,703,470 B2
(45) Date of Patent: Mar. 9, 2004

(54) CONJUGATED DIENE-BASED RUBBER, OIL EXTENDED RUBBER AND RUBBER COMPOSITION CONTAINING THE SAME

(75) Inventors: Tomohisa Konno, Tokyo (JP); Yoshiyuki Udagawa, Tokyo (JP); Toshihiro Tadaki, Tokyo (JP)

(73) Assignee: JSR Corporation, Tokyo (JP)

( * ) Notice: Subject to any disclaimer, the term of this patent is extended or adjusted under 35 U.S.C. 154(b) by 188 days.

(21) Appl. No.: 09/940,895

(22) Filed: Aug. 29, 2001

(65) Prior Publication Data

US 2002/0045691 A1 Apr. 18, 2002

(30) Foreign Application Priority Data

Aug. 30, 2000 (JP) ........................................ 2000-261717

(51) Int. Cl.[7] ...................... C08F 212/10; C08F 212/34; C08F 236/10; C08F 236/12
(52) U.S. Cl. ...................... 526/335; 526/338; 526/342; 526/347; 526/340; 526/340.1; 524/565; 524/566; 524/575; 524/543; 524/556; 524/850; 524/853
(58) Field of Search ................... 526/338, 342, 526/347, 340, 340.1, 335; 524/565, 566, 575, 543, 556, 850, 853

(56) References Cited

U.S. PATENT DOCUMENTS

| | | | |
|---|---|---|---|
| 4,102,844 A | * | 7/1978 | Schwinum et al. ..... 260/29.7 T |
| 4,445,959 A | | 5/1984 | Hombach et al. |
| 6,455,153 B1 | * | 9/2002 | Lonc et al. ................. 428/352 |

FOREIGN PATENT DOCUMENTS

| | | | |
|---|---|---|---|
| DE | DE 196 43 035 | | 4/1998 |
| EP | EP 0 992 537 | | 4/2000 |
| JP | 54-58794 | * | 5/1979 |
| JP | 9-208623 | | 8/1997 |
| JP | 9-208633 | | 8/1997 |
| WO | WO 96/23027 | | 8/1996 |

* cited by examiner

*Primary Examiner*—Roberto Rabago
(74) *Attorney, Agent, or Firm*—Oblon, Spivak, McClelland, Maier & Neustadt, P.C.

(57) ABSTRACT

An objective of the invention is to provide a conjugated diene-based rubber having a specific composition and an oil extended rubber using the same, as well as a rubber composition capable of being converted into a vulcanized rubber which has a low rolling resistance, an excellent wearing resistance and the like, and is useful for a tire or the like. A conjugated diene-based rubber in the invention has repeating units consisting of 1 to 30% by mass of an olefinically unsaturated nitrile monomer unit such as acrylonitrile, 10 to 50% by mass of an aromatic vinyl monomer unit such as styrene, 19.9 to 88.9% by mass of a conjugated diene monomer unit such as 1,3-butadiene and 0.1 to 10% by mass of a monomer unit having one polymerizable unsaturated group and at least one functional group selected from the group consisting of an amino group, a hydroxyl group, an epoxy group, a carboxyl group and an alkoxysilyl group, and has a specific glass transition point and a Mooney viscosity [$ML_{1+4}(100°\ C.)$]. An oil extended rubber in the invention comprises 100 parts by mass of a conjugated diene-based rubber and 10 to 60 parts by mass of an extending oil. A rubber composition in the invention comprises a conjugated diene-based rubber or an oil extended rubber and an inorganic filler such as a silica.

20 Claims, 1 Drawing Sheet

# CONJUGATED DIENE-BASED RUBBER, OIL EXTENDED RUBBER AND RUBBER COMPOSITION CONTAINING THE SAME

FIELD OF THE INVENTION

The present invention relates to a conjugated diene-based rubber capable of being converted into a vulcanized rubber having a low rolling resistance, an excellent wet skid property sufficient wearing resistance, tensile strength and the like when incorporating an inorganic filler such as silica as a reinforcing agent, and also to an oil extended rubber containing such rubber and an extending oil. The present invention also relates to a rubber composition comprising a conjugated diene-based rubber or an oil extended rubber described above and an inorganic filler and having an excellent processability. This rubber composition gives a vulcanized rubber which is useful especially as a tire tread.

DESCRIPTION OF THE PRIOR ART

In response to recent demand for low gas mileage of automobile, rubber material such as a conjugated diene-based rubber or the like capable of giving a rubber composition for a tire which has low rolling resistance, excellent wearing resistance and destruction characteristics and whose wet skid resistance, which is a representative index of a driving stability, is high is desired.

Tire rolling resistance can be reduced by lowering hysteresis loss of vulcanized rubber. The hysteresis loss can be evaluated based on various properties. For example, compositions preferably have high impact resilience at 50–80° C., a low tan δ at 50–80° C. or low Goodrich heat release. Compositions with low hysteresis loss include natural rubber, isoprene rubber, butadiene rubber and the like, but these are also associated with the problem of low wet skid resistance.

In recent years, there have been proposed methods of using inorganic filler such as silica and the like to serve as reinforcing agent, or combining inorganic filler with carbon black. Tire treads employing inorganic filler or both inorganic filler and carbon black have low rolling resistance and excellent driving stability, represented by, for example, the wet skid resistance. However, they exhibit a problem of poor wearing resistance, tensile strength and the like for the vulcanized rubber. The cause is believed to be the fact that the affinity of inorganic filler for the conjugated diene-based rubber is lower than that of carbon black, such that a sufficient reinforcing effect cannot be achieved.

In order to increase the affinity between the silica as an inorganic filler and the conjugated diene-based rubber, it has been attempted to use conjugated diene-based rubbers introduced therein functional group with affinity for inorganic filler. For example, there have been proposed a conjugated diene-based rubber introduced a hydroxyl group therein (WO96/23027), a conjugated diene-based rubber introduced an alkoxysilyl group therein (Japanese Patent laid-open publication No. HEI-9-208623) and a conjugated diene-based rubber introduced an alkoxysilyl group and an amino and/or a hydroxyl group therein (Japanese Patent laid-open publication No. HEI-9-208633). However, most conjugated diene-based rubbers with such an introduced functional group exhibit strong interaction with an inorganic filler when the inorganic filler is combined therewith, and this creates such problems as impaired dispersion of the inorganic filler, greater heat release during processing, poor processability and the like.

SUMMARY OF THE INVENTION

The present invention solves the problems associated with prior arts described above and is intended to provide a conjugated diene-based rubber and an oil extended rubber, each of which is capable of being converted into a vulcanized rubber having a low rolling resistance, an excellent wet skid property and sufficient wearing resistance, tensile strength, and the like. Another aspect of the invention is intended to provide a rubber composition capable of being converted into a vulcanized rubber which has an excellent processability and is useful as a tire tread of an automobile or the like.

A rubber composition for a tire tread and the like usually contains a reinforcing agent for the purpose of improving tensile strength and wearing resistance, but silica and similar substances do not easily disperse uniformly because of their tendency to aggregate. When using a rubber composition in which the reinforcing agent is not uniformly dispersed, the desired effect of including the reinforcing agent cannot be achieved, while the processability is also notably impaired. For this reason, it has generally been attempted to improve the dispersion properties by also including a silane coupling agent when using a silica as an inorganic filler.

It was discovered that by using a conjugated diene-based rubber having a certain composition in which an unsaturated nitrile monomer unit is contained in a molecular chain a sufficient improvement in the wearing resistance, the tensile strength, and the like as well as the processability can be achieved even with a reduced amount of a silane coupling agent or rather without any silane coupling agent.

The present invention is based on the findings described above and can be described as follows.

1. A conjugated diene-based rubber being characterized in having a repeating unit comprising ① 1 to 30% by mass of an olefinically unsaturated nitrile monomer unit, ② 10 to 50% by mass of an aromatic vinyl monomer unit ③ 19.9 to 88.9% by mass of a conjugated diene monomer unit and ④ 0.1 to 10% by mass of a monomer unit having one polymerizable unsaturated group and at least one functional group selected from the group consisting of an amino group, a hydroxy group, an epoxy group, a carboxyl group and an alkoxysilyl group [where the total of ①, ②, ③ and ④ is 100% by mass], and whose Mooney viscosity [$ML_{1+4}$ (100° C.)] is 20 to 200.

2. A conjugated diene-based rubber according to 1 above wherein, the glass transition point of the above-mentioned conjugated diene-based rubber is −60 to 0° C., and the difference between the extrapolated temperatures of the initiation and the termination of the above-mentioned glass transition is 20° C. or less.

3. A conjugated diene-base rubber according to 2 above wherein, a monomer forming the above-mentioned olefinically unsaturated nitrile monomer unit is at least one selected from the group consisting of acrylonitrile and methacrylonitrile;

a monomer forming the above-mentioned aromatic vinyl monomer unit is at least one selected from the group consisting of styrene, 2-methylstyrene, 3-methylstyrene, 4-methylstyrene, α-methylstyrene, 2,4-dimethylstyrene, 2,4-diisopropylstyrene, 4-tert-butylstyrene and tert-butoxystyrene;

a monomer forming the above-mentioned conjugated diene monomer unit is at least one selected from the group consisting of 1,3-butadiene, isoprene, 2,3-dimethyl-1,3-butadiene and chloroprene.

4. An oil extended rubber being characterized in comprising 100 parts by mass of a conjugated diene-based rubber which has a repeating unit comprising ① 1 to 30% by mass of an olefinically unsaturated nitrile monomer unit, ② 10 to 50% by mass of an aromatic vinyl monomer unit ③ 19.9 to 88.9% by mass of a conjugated diene monomer unit and ④ 0.1 to 10% by mass of a monomer unit having one polymerizable unsaturated group and at least one functional group selected from the group consisting of an amino group, a hydroxy group, an epoxy group, a carboxyl group and an alkoxysilyl group [where the total of ①, ②, ③ and ④ is 100% by mass], and whose Mooney viscosity [$ML_{1+4}$ (100° C.)] is 40 to 200, and 10 to 60 parts by mass of an extending oil.

5. An oil extended rubber according to 4 above wherein, the transition point of the above-mentioned conjugated diene-based rubber is −60 to 0° C., and the difference between the extrapolated temperatures of the initiation and the termination of the above-mentioned glass transition is 20° C. or less.

6. An oil extended rubber according to 5 above wherein,
   a monomer forming the above-mentioned olefinically unsaturated nitrile monomer unit is at least one selected from the group consisting of acrylonitrile and methacrylonitrile;
   a monomer forming the above-mentioned aromatic vinyl monomer unit is at least one selected from the group consisting of styrene, 2-methylstyrene, 3-methylstyrene, 4-methylstyrene, α-methylstyrene, 2,4-dimethylstyrene, 2,4-diisopropylstyrene, 4-tert-butylstyrene and tert-butoxystyrene;
   a monomer forming the above-mentioned conjugated diene monomer unit is at least one selected from the group consisting of 1,3-butadiene, isoprene, 2,3-dimethyl-1,3-butadiene and chloroprene.

7. An oil extended rubber according to 6 above wherein, the above-mentioned extending oil is at least one selected from the group consisting of an aromatic-based oil, a naphthene-based oil and a paraffin-based oil.

8. A rubber composition being characterized in comprising 100 parts by mass of a conjugated diene-based rubber which has a repeating unit comprising ① 1 to 30% by mass of an olefinically unsaturated nitrile monomer unit, ① 10 to 50% by mass of an aromatic vinyl monomer unit ③ 19.9 to 88.9% by mass of a conjugated diene monomer unit and ④ 0.1 to 10% by mass of a monomer unit having one polymerizable unsaturated group and at least one functional group selected from the group consisting of an amino group, a hydroxy group, an epoxy group, a carboxyl group and an alkoxysilyl group [where the total of ①, ②, ③ and ④ is 100% by mass], and whose Mooney viscosity [$ML_{1+4}$ (100° C.)] is 20 to 200, and 10 to 150 parts by mass of an inorganic filler.

9. A rubber composition according to 8 above wherein, the transition point of the above-mentioned conjugated diene-based rubber is −60 to 0° C., and the difference between the extrapolated temperatures of the initiation and the termination of the above-mentioned glass transition is 20° C. or less.

10. A rubber composition according to 9 above wherein,
    a monomer forming the above-mentioned olefinically unsaturated nitrile monomer unit is at least one selected from the group consisting of acrylonitrile and methacrylonitrile;
    a monomer forming the above-mentioned aromatic vinyl monomer unit is at least one selected from the group consisting of styrene, 2-methylstyrene, 3-methylstyrene, 4-methylstyrene, α-methylstyrene, 2,4-dimethylstyrene, 2,4-diisopropylstyrene, 4-tert-butylstyrene and tert-butoxystyrene;
    a monomer forming the above-mentioned conjugated diene monomer unit is at least one selected from the group consisting of 1,3-butadiene, isoprene, 2,3-dimethyl-1,3-butadiene and chloroprene.

11. A rubber composition according to 10 above wherein the above-mentioned inorganic filler is a silica.

12. A rubber composition according to 11 above further comprising a carbonblack.

13. A rubber composition according to 11 or 12 above further comprising a silane coupling agent.

14. A rubber composition according to 8 above further comprising 10 to 60 parts by mass of an extending oil based on 100 parts by mass of the above-mentioned conjugated diene-based rubber and the Mooney viscosity [$ML_{1+4}$ (100° C.)] of the above-mentioned conjugated diene-based rubber is 40 to 200.

15. A rubber composition according to 14 above wherein, the transition point of the above-mentioned conjugated diene-based rubber is −60 to 0° C., and the difference between the extrapolated temperatures of the initiation and the termination of the above-mentioned glass transition is 20° C. or less.

16. A rubber composition according to 15 above wherein,
    a monomer forming the above-mentioned olefinically unsaturated nitrile monomer unit is at least one selected from the group consisting of acrylonitrile and methacrylonitrile;
    a monomer forming the above-mentioned aromatic vinyl monomer unit is at least one selected from the group consisting of styrene, 2-methylstyrene, 3-methylstyrene, 4-methylstyrene, α-methylstyrene, 2,4-dimethylstyrene, 2,4-diisopropylstyrene, 4-tert-butylstyrene and tert-butoxystyrene;
    a monomer forming the above-mentioned conjugated diene monomer unit is at least one selected from the group consisting of 1,3-butadiene, isoprene, 2,3-dimethyl-1,3-butadiene and chloroprene.

17. A rubber composition according to 16 above wherein, the above-mentioned extending oil is at least one selected from the group consisting of an aromatic-based oil, a naphthene-based oil and a paraffin-based oil.

18. A rubber composition according to 17 above wherein the above-mentioned inorganic filler is a silica.

19. A rubber composition according to 18 above further comprising a carbonblack.

20. A rubber composition according to 18 or 19 above further comprising a silane coupling agent.

A rubber composition of the present invention has a satisfactory processability and gives a rubber product having a low rolling resistance, a vulcanized rubber having an excellent wet skid property, sufficient wearing resistance, tensile strength and the like, which is useful especially as a tire. A conjugated diene-based rubber and an oil extended ruber of the invention are useful in producing a rubber composition described above.

DETAILED DESCRIPTION OF THE INVENTION

A conjugated diene-based rubber according to the invention is a copolymer obtained by copolymerizing an olefinically unsaturated nitrile monomer (hereinafter referred to as Monomer ①), an aromatic vinyl monomer (hereinafter referred to as Monomer ②) and a conjugated diene monomer (hereinafter referred to as Monomer ③), and preferably is a random copolymer.

Monomer ① may be used acrylonitrile, methacrylonitrile and the like. Among these, acrylonitrile is preferred. Any of these Monomers ① may be used alone or in combination of two or more.

The monomer unit formed by Monomer ①, in a repeating unit constituting the conjugated diene-based rubber, is in an amount of 1 to 30% by mass, preferably 3 to 30% by mass, more preferably 6 to 20% by mass. An amount of the monomer unit formed by Monomer ① less than 1% by mass leads to a poor dispersion of an inorganic filler, resulting in an insufficiently improved wearing resistance or the like of a vulcanized rubber obtained. On the other hand, an amount exceeding 30% by mass leads to a poor low temperature performance of a vulcanized rubber obtained.

Monomer ② may be used styrene, 2-methylstyrene, 3-methylstyrene, 4-methylstyrene, α-methylstyrene, 2,4-dimethylstyrene, 2,4-diisopropylstyrene, 4-tert-butylstyrene, tert-butoxystyrene and the like. Among these, styrene is preferred. Any of these Monomers ② may be used alone or in combination of two or more.

The monomer unit formed by Monomer ②, in a repeating unit constituting a conjugated diene-based rubber, is in an amount of 10 to 50% by mass, preferably 15 to 40% by mass. An amount of the monomer unit formed by Monomer ② less than 10% by mass leads to a reduced wearing resistance of a vulcanized rubber obtained. On the other hand, an amount exceeding 50% by mass leads to a reduced repelling elasticity of a vulcanized rubber obtained, resulting in an increased tan δ.

Monomer ③ may be used 1,3-butadiene, isoprene, 2,3-dimethyl-1,3-butadiene, chloroprene and the like. Among these, 1,3-butadiene and isoprene are especially preferred. Any of these Monomers ③ may be used alone or in combination of two or more.

The monomer unit formed by Monomer ③, in a repeating unit constituting a conjugated diene-based rubber, is in an amount of 19.9 to 88.9% by mass, preferably 19.9 to 80% by mass. An amount of the monomer unit formed by Monomer ③ less than 19.9% by mass leads to a reduced repelling elasticity of a vulcanized rubber obtained, resulting in an increased tan δ.

Among Monomer ④, a monomer having one polymerizable unsaturated group and an amino group is preferably a monomer having a tertiary amino group, including;
(a) dialkylaminoalkyl (meth)acrylates such as dimethylaminomethyl (meth)acrylate, diethylaminomethyl (meth)acrylate, 2-dimethylaminoethyl (meth)acrylate, 2-diethylaminoethyl (meth)acrylate, 2-dimethylaminoethyl (meth)acrylate, 2-diethylaminoethyl (meth)acrylate, 2-(d-n-propylamino) ethyl (meth)acrylate, 2-dimethylaminopropyl (meth)acrylate, 2-diethylaminopropyl (meth)acrylate, 2-(d-n-propylamino)propyl (meth)acrylate, 3-dimethylaminopropyl (meth)acrylate, 3-diethylaminopropyl (meth)acrylate and 3-(d-n-propylamino)propyl (meth)acrylate, and the like;
(b) N-dialkylaminoalkyl group-containing unsaturated amides such as N-dimethylaminomethyl (meth)acrylamide, N-diethylaminomethyl (meth)acrylamide, N-(2-dimethylaminoethyl) (meth)acrylamide, N-(2-diethylaminoethyl) (meth)acrylamide, N-(2-diethylaminopropyl) (meth)acrylamide, N-(3-dimethylaminopropyl) (meth)acrylamide, N-(3-diethylaminopropyl) (meth)acrylamide and the like;
(c) tertiary amino group-containing vinyl aromatic compounds, such as N,N-dimethyl-p-aminostyrene, N,N-diethyl-p-aminostyrene, dimethyl(p-vinylbenzyl)amine, diethyl(p-vinylbenzyl)amine, dimethyl(p-vinylphenethyl) amine, diethyl(p-vinylphenethyl)amine, dimethyl(p-vinylbenzyloxymethyl)amine, dimethyl[2-(p-vinylbenzyloxy)ethyl] amine, diethyl(p-vinylbenzyloxymethyl)amine, diethyl[2-(p-vinylbenzyloxy)ethyl]amine, dimethyl(p-vinylphenethyloxymethyl)amine, dimethyl[2-(p-vinylphenethyloxy)ethyl] amine, diethyl(p-vinylphenethyloxymethyl)amine, diethyl[2-(p-vinylphenethyloxy)ethyl] amine, 2-vinylpyridine, 3-vinylpyridine, 4-vinylpyridine and the like.

Among these listed above, a dialkylaminoalkyl (meth)acrylate and a tertiary amino group-containing vinyl aromatic compound are preferred. More typically, dimethylaminomethyl (meth)acrylate, diethylaminomethyl (meth)acrylate, 2-dimethylaminoethyl (meth)actylate, 2-diethylaminoethyl (meth)acrylate, 2-dimethylaminopropyl (meth)acrylate, 2-diethylaminopropyl (meth)acrylate, 3-dimethylaminopropyl (meth)acrylate, 3-diethylaminopropyl (meth)acrylate, N,N-dimethyl-p-aminostyrene, N,N-diethyl-p-aminostyrene, dimethyl (p-vinylbenzyl)amine and diethyl (p-vinylbenzyl) amine are preferred. Any of these amino group-containing monomers may be employed alone or in combination of two or more.

A monomer having one polymerizable unsaturated group and a hydroxyl group includes;
(a) hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate and the like;
(b) mono (meth)acrylates of a polyalkylene glycol (the number of alkylene glycol units is for example 2 to 23) such as polyethylene glycol, polypropylene glycol and the like;
(c) Hydroxyl group-containing unsaturated amides such as N-hydroxymethyl (meth)acrylamide, N-(2-hydroxyethyl) (meth)acrylamide, N,N-bis(2-hydroxyethyl) (meth) acrylamide and the like;
(d) hydroxyl group-containing vinyl aromatic compounds such as o-hydroxystyrene, m-hydroxystyrene, p-hydroxystyrene, o-hydroxy-α-methylstyrene, m-hydroxy-α-methylstyrene, p-hydroxy-α-methylstyrene, p-vinylbenzyl alcohol and the like;
(e) (meth)allyl alcohols and the like.

Among those listed above, hydroxyalkyl (meth)acrylates and hydroxyl group-containing vinyl aromatic compounds are preferred. More typically, 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, o-hydroxystyrene, m-hydroxystyrene and p-hydroxystyrene are preferred. Any of the hydroxyl group-containing monomers may be employed alone or in combination of two or more.

A monomer having one polymerizable unsaturated group and an epoxy group includes (meth)allylglycidylether, glycidyl (meth)acrylate and 3,4-oxycyclohexyl (meth)acrylate, and the like. More typically, glycidyl (meth)acrylate is preferred. Any of these epoxy group-containing monomers may be employed alone or in combination of two or more.

A monomer having one polymerizable unsaturated group and a carboxyl group includes;
(a) unsaturated carboxylic acids such as (meth)acrylic acid, maleic acid, fumaric acid, itaconic acid, tetraconic acid, cinnamic acid and the like as well as a salt or the like thereof; and, (b) free carboxyl group-containing esters such as a monoester or the like of a non-polymerizable polyvalent carboxylic acid such as phthalic acid, succinic acid, adipic acid and the like with a hydroxyl group-containing unsaturated compound such as (meth)allyl alcohol, 2-hydroxyethyl (meth)acrylate and the like as well as a salt or the like thereof.

Among those listed above, an unsaturated carboxylic acid is preferred. More typically, acrylic acid, methacrylic acid, maleic acid, fumaric acid and itaconic acid are preferred. Any of these carboxy group-containing monomers may be used alone or in combination of two or more.

A monomer having one polymerizable unsaturated group and an alkoxysilyl group includes; (meth)acryloxymethyl trimethoxysilane, (meth)acryloxymethyl methyldimethoxysilane, (meth)acryloxymethyl dimethylmethoxysilane, (meth)acryloxymethyl triethoxysilane, (meth)acryloxymethyl methyldiethoxysilane, (meth)acryloxymethyl dimethylethoxysilane, (meth)acryloxymethyl tripropoxysilane, (meth)acryloxymethyl methyldipropoxysilane, (meth)acryloxymethyl dimethylpropoxysilane, γ-(meth)acryloxypropyl trimethoxysilane, γ-(meth)acryloxypropyl methyldimethoxysilane, γ-(meth)acryloxypropyl dimethylmethoxysilane, γ-(meth)acryloxypropyl triethoxysilane, γ-(meth)acryloxypropyl methyldiethoxysilane, γ-(meth)acryloxypropyl dimethylethoxysilane, γ-(meth)acryloxypropyl tripropoxysilane, γ-(meth)acryloxypropyl methyldipropoxysilane, γ-(meth)acryloxypropyl dimethylpropoxysilane, γ-(meth)acryloxypropyl methyldiphenoxysilane, γ-(meth)acryloxypropyl dimethylphenoxysilane, γ-(meth)acryloxypropyl methyldibenzyloxysilane, γ-(meth)acryloxypropyl dimethyliphenoxysilane, and the like.

Among those listed above, γ-(meth)acryloxypropyl trimethoxysilane, γ-(meth)acryloxypropyl methyldimethoxysilane γ-(meth)acryloxypropyl dimethylmethoxysilane, γ-(meth)acryloxypropyl triethoxysilane, γ-(meth) acryloxypropyl methyldiethoxysilane, γ-(meth) acryloxypropyl dimethylethoxysilane, γ-(meth) acryloxypropyl tripropoxysilane, γ-(meth)acryloxypropyl methyldipropoxysilane and γ-(meth)acryloxypropyl dimethylpropoxysilane are preferred. Any of these alkoxysilyl group-containing monomers may be used alone or in combination of two or more.

The monomer unit formed by Monomer ④, in a repeating unit constituting a conjugated diene-based rubber, is in an amount of 0.1 to 10% by mass, preferably 0.1 to 5% by mass. An amount of the monomer unit formed by Monomer ④ less than 0.1% by mass leads to an insufficient affinity between the conjugated diene-based rubber and an inorganic filler such as a silica, resulting in an insufficient improvement in tan δ and the wearing resistance. On the other hand, an amount exceeding 10% by mass leads to a firm aggregation between the conjugated diene-based rubber and an inorganic filler such as a silica, resulting in a poor processability.

A conjugated diene-based rubber may be obtained by copolymerizing various monomers if necessary in addition to Monomers ①, ②, ③ and ④.

Such monomer may be used an ester-based monomer including a (meth)acrylate such as methyl (meth)acrylate, ethyl (meth)acrylate, n-propyl (meth)acrylate, isopropyl (meth)acrylate, n-amyl (meth)acrylate, n-hexyl (meth)acrylate, 2-ethylhexyl (meth)acrylate, cyclohexyl (meth)acrylate and the like as well as a vinyl ester such as vinyl acetate or the like. While such ester-based monomer can be used in an amount by which the characteristics of the conjugated diene-based rubber is not affected adversely, the monomer unit formed by the ester-based monomer is preferably in an amount of 20% by mass or less based on the total monomer units.

The "Mooney viscosity" [$ML_{1+4}$ (100° C.)] of the conjugated diene-based rubber is 20 to 200, preferably 30 to 150. The Mooney viscosity less than 20 leads to a reduced wearing resistance of a vulcanized rubber obtained. On the other hand, the viscosity exceeding 200 leads to a poor processability of a rubber composition containing this conjugated diene-based rubber.

While the "glass transition point" of the conjugated diene-based rubber may vary depending on the composition of the monomers employed, it is preferably −60 to 0° C., more preferably −50 to −10° C., when determined by a differential scanning calorimeter (DSC) in accordance with ASTM D3418–82 (reapproved 1988). In addition, the difference between the extrapolated temperatures of the initiation and the termination of the glass transition is preferably 20° C. or less, preferably 18° C. or less. A difference exceeding 20° C. leads a vulcanized rubber having a reduced wet skid resistance and an increased tan δ, which are not preferable.

The weight-average molecular weight of the conjugated diene-based rubber represented as polystyrene determined by a gel permeation chromatography (GPC) is preferably 100,000 or more, more preferably 100,000 to 2,000,000, particularly 200,000 to 1,500,000. The weight-average molecular weight less than 100,000 may lead to a reduced wearing resistance of a vulcanized rubber obtained, which may results in an increased tan δ. On the other hand, the molecular weight exceeding 2,000,000 may lead to a poor processability of a rubber composition containing this conjugated diene-based rubber. This weight-average molecular weight can be controlled during polymerization by using a chain transferring agent such as an alkylmercaptan employed commonly in a radical polymerization.

The conjugated diene-based rubber can be produced by polymerizing Monomers ①, ②, ③ and ④ optionally with an ester-based monomer in the presence of a radical initiator in an aqueous medium. While the polymerization method is not particularly limited, it is preferably an emulsion polymerization in an usual case. Such emulsion polymerization may be performed by any ordinary method, such as a method in which a certain monomer is emulsified in an aqueous medium in the presence of an emulsifier and the polymerization is initiated using a radical initiator and then terminated using an inhibitor once a predetermined conversion is achieved.

In a preferred manner of adding Monomer ①, its portion is added prior to the initiation of the polymerization and the remainder is then added to the polymerization system intermittently or continuously over the polymerization process, or its entire amount is added to the polymerization system intermittently or continuously over the polymerization process. It is not preferable to add the entire amount of Monomer ① prior to the initiation of the polymerization to effect a copolymerization, since the difference between the temperatures of the initiation and the termination of the glass transition of the copolymeric rubber tends to exceed 20° C.

An emulsifier may be used an anionic surfactant, a nonionic surfactant, a cationic surfactant, an amphoteric surfactant and the like. A fluorine-based surfactant may also be employed. Any of these emulsifiers may be used alone or in combination of two or more. Among these emulsifiers, those employed frequently are anionic surfactants, such as a potassium or sodium salt or the like of a long chain fatty acid having 10 or more carbon atoms such as capric acid, lauric acid, myristic acid, palmitic acid, oleic acid, stearic acid, and the like, as well as a rosin acid salt or the like.

A radical initiator may be used an organic peroxide such as benzoyl peroxide, lauroyl peroxide, tert-butyl hydroperoxide, cumene hydroperoxide, p-menthane hydroperoxide, di-tert-butyl peroxide, dicumyl peroxide, and the like. Those which may also be employed are an azo compound such as azobisisobutyronitrile, an inorganic peroxide such as potassium persulfate as well as any of these peroxides in combination with ferrous sulfate which is one of redox catalysts or the like. Any of these radical initiators may be used alone or in combination of two or more.

For the purpose of adjusting the molecular weight of a conjugated diene-based rubber, a chain transferring agent including an alkylmercaptan such as tert-dodecylmercaptan and n-dodecylmercaptan, carbon tetrachloride, a thioglycol, diterpene, terpinolene, γ-terpinene, and the like can also be employed.

A polymerization can be effected in an oxygen-free reaction vessel at a temperature of 0 to 100° C., and an especially preferred polymerization temperature ranges from 0 to 80° C. The polymerization may be of a continuous process or a batch process, and the operating conditions or the like such as the polymerization temperature or the like and the stirring manner or the like can appropriately be changed in the course of the reaction. Since a higher conversion of the polymerization may leads to a gelation, it is preferable to keep the conversion of the polymerization at 80% or less. The polymerization can be terminated, once a predetermined conversion of the polymerization is accomplished, by adding an inhibitor. Such inhibitor may for example be an amine compound such as hydroxylamine, diethylhydroxylamine, and the like or a quinone compound or the like such as hydroquinone or the like.

After terminating the polymerization, a resultant conjugated diene-based rubber latex is made free from unreacted monomers if necessary by means of steam distillation and the like, and then supplemented with a salt such as sodium chloride, potassium chloride and calcium chloride together with hydrochloric acid, nitric acid or sulfuric acid if necessary to allow the conjugated diene-based rubber to be aggregated as crumb. This crumb is washed, dehydrated and then dried with a drier or the like, whereby obtaining a conjugated diene-based rubber.

The oil extended rubber in the present invention contains a conjugated diene-based rubber and an extending oil.

The Mooney viscosity [$ML_{1+4}$ (100° C.)] of the conjugated diene-based rubber constituting the oil extended rubber is 40 to 200 and is preferably 70 to 170. The Mooney viscosity less than 40 leads to a reduced wearing resistance of a vulcanized rubber obtained. On the other hand, the viscosity exceeding 200 leads to a poor processability of a rubber composition containing this oil extended rubber.

The extending oil described above is not particularly limited, it may be used an aromatic-based oil, a naphthene-based oil and a paraffin-based oil. Any of these oils may be used alone or in combination of two or more. Among these oils, an aromatic-based extending oil is preferred particularly.

The extending oil described above may be present in an amount of 10 to 60 parts, preferably 20 to 50 parts, based on 100 parts by mass (hereinafter abbreviated as parts) of the conjugated diene-based rubber. An amount of the extending oil less than 10 parts leads to an insufficient improvement in the processability, while an amount exceeding 60 parts is also problematic since the ratio of the extending oil to be incorporated during the preparation of the rubber composition for obtaining a required processability is limited. The Mooney viscosity [$ML_{1+4}$ (100° C.)] of an oil extended rubber obtained is preferably 20 to 180, more preferably 30 to 150.

The oil extended rubber in the invention can be obtained by mixing an aqueous solution of an emulsifier and an extending oil, preparing an emulsion of the extending oil for example by stirring, mixing with a conjugated diene-based rubber latex, and then aggregating by the method described above.

The rubber composition in the present invention contains a conjugated diene-based rubber and an inorganic filler. The Mooney viscosity [$ML_{1+4}$ (100° C.)] of the conjugated diene-based rubber constituting the rubber composition is 20 to 200 and is preferably 30 to 150. The rubber composition can be that further includes an extending oil. The extending oil described above may be present in an amount of 10 to 60 parts, preferably 20 to 50 parts, based on 100 parts by mass of the conjugated diene-based rubber. When the extending oil is employed, the Mooney viscosity [$ML_{1+4}$ (100° C.)] of the conjugated diene-based rubber is preferably 40 to 200.

Other conjugated diene-based rubber may additionally be employed as a rubber component constituting the rubber composition. Such rubber component may be used a styrene-butadiene copolymeric rubber, a butadiene rubber, an isoprene rubber, a butadiene-isoprene copolymeric rubber, a butadiene-styrene-isoprene copolymeric rubber, an acrylonitrile-butadiene copolymeric rubber, a natural rubber, a chloroprene rubber and the like.

An inorganic filler may be used silica, aluminum hydroxide, composite oxide contained silicon oxide such as a composite oxide formed by silicon oxide and at least one selected from aluminium oxide, calcium oxide and magnesium oxide, zinc oxide, clay, calcium carbonate, magnesium carbonate and the like. Among these, silica is prefered. Such silica is not particularly limited and may be any one used generally as a bright color reinforcing agent for a synthetic rubber. While the type of a silica is not particularly limited, a wet process type white carbon, a dry process type white carbon, a colloidal silica and a precipitated silica and the like described in Japanese Patent laid-open publication 62-62838 can be employed. Among those listed above, a wet process type white carbon whose main component is silicic hydrate is preferred particularly. Any of these silica-based compound may be employed alone or in combination of two or more. While the specific surface area of the silica is not particularly limited, a nitrogen absorption specific surface area (area determined by BET method in accordance with ASTM D3037–81) is usually 50 to 400 m$^2$/g, preferably 50 to 220 m$^2$/g, more preferably 70 to 220 m$^2$/g, for the purpose of achieving a sufficient improvement in the reinforcing performance, the wearing resistance and the exothermic behavior, and the like.

The inorganic filler such as a silica or the like may preferably be present in an amount of 10 to 150 parts, particularly 20 to 100 parts based on 100 parts of a total rubber component. An amount of the inorganic filler less than 10 parts leads to an insufficient reinforcing effect, resulting in a poor wet skid property of a vulcanized rubber obtained or the like. A sufficient reinforcing effect can be accomplished when the filler amounts to 150 parts, and no further amount is required.

A carbon black, carbon-silica dual-phase filler and the like may be also added for purpose of reinforcing the rubber product.

While the type of the carbon black is not particularly limited, those which may be employed are a furnace black, an acetylene black, a thermal black, a channel black, a graphite, and the like. Among those listed above, a furnace black is preferred including SAF, ISAF, ISAF-HS, ISAF-LS, IISAF-HS, HAF, HAF-HS, HAF-LS, FEF, and the like. Any of these carbon blacks may be employed alone or in combination of two or more.

While the nitrogen absorption specific surface area of a carbon black determined similarly to a silica is not particularly limited, it is usually 5 to 200 $m^2/g$, preferably 50 to 150 $m^2/g$, more preferably 80 to 130 $m^2/g$, for the purpose of achieving a sufficient improvement in the tensile strength and the wearing resistance of a vulcanized rubber and the like. While the DBP absorption level of the carbon black is not particularly limited as well, it is 5 to 300 ml/100 g, preferably 50 to 200 ml/100 g, more preferably 80 to 160 ml/100 g, for the purpose of a sufficient improvement in the tensile strength and the wearing resistance, and the like. A further improvement in the wearing resistance can be achieved by using as a carbon black a high structure carbon black described in Japanese Patent laid-open publication 5-230290, whose cetyltrimethylammonium bromide absorption specific surface area is 110 to 170 $m^2/g$ and whose DBP (24M4DBP) oil absorption level after compressing under 165 MPa four times repetitively is 110 to 130 ml/100 g.

A carbon black may be employed with the inorganic filler described above. When the inorganic filler is a silica, the total amount is preferably 10 to 150 parts, especially 50 to 100 parts based on 100 parts of the conjugated diene-based rubber in the case of employing the silica and the carbon black concomitantly. A total amount less than 10 parts leads to an insufficient reinforcing effect, resulting in a poor wet skid property of a vulcanized rubber obtained or the like. A sufficient reinforcing effect can be accomplished when the total amount is 150 parts, and no further amount is required. While the ratio between a silica and a carbon black is not particularly limited, 100 parts of the silica is combined preferably with 5 to 30 parts, especially 10 to 15 parts of the carbon black. Within this range of the ratio, a vulcanized rubber which is excellent in all of the wet skid property, the repelling elasticity and the tensile strength can be obtained.

In addition to the components described above, other additives such as vulcanizing agents, silane coupling agents, anti-aging agents, processing aids and the like may also be employed.

While a representative vulcanizing agent is sulfur, other materials such as sulfur-containing compounds and peroxides or the like may also be employed. Such vulcanizing agent is present preferably in an amount usually of 0.5 to 10 parts, especially 1 to 6 parts, based on 100 parts of a rubber component.

When using a vulcanizing agent, a vulcanizing accelerator, a vulcanizing aid and the like may also be employed. Such vulcanizing accelerator may be used an aldehyde ammonia-based vulcanizing accelerator such as hexamethylenetetramine;

a sulfenamide-based vulcanization accelerator such as N-cyclohexyl-2-benzothiazolesulfenamide, N-tert-butyl-2-benzothiazolesulfenamide, N-oxyethylene-2-benzothiazolesulfenamide and N,N'-diisopropyl-2-benzothiazolesulfenamide, a guanidine-based vulcanization accelerator such as diphenylguanidine, diorthotolylguanidine and orthotolylbiguanidine and a thiourea-based vulcanization accelerator such as thiocarboanilide, diorthotolylthiourea, ethylene thiourea, diethylthiourea and trimethylthiourea;

a thiazol-based vulcanization accelerator such as 2-mercaptobenzothiazol, dibenzothiazyldisulfide, 2-mercaptobenzothiazole zinc salt, 2-mercaptobenzothiazole sodium salt, 2-mercaptobenzothiazole cyclohexylamine salt and 2-(2,4-dinitrophenylthio)benzothiazole and thiuram-based vulcanization accelerator such as tetramethylthiuram monosulfide, tetramethylthiuram disulfide, tetraethylthiuram disulfide, tetrabutylthiuram disulfide and dipentamethylenethiuram tetrasulfide;

a dithiocarbamate-based vulcanization accelerator such as sodium dimethyldithiocarbamate, sodium diethyldithiocarbamate, sodium di-n-butyldithiocarbamate, lead dimethyldithiocarbamate, zinc dimethyldithiocarbamate, zinc diethyldithiocarbamate, zinc di-n-butyldithiocarbamate, zinc pentamethylenedithiocarbamate, zinc ethylphenyldithiocarbamate, tellurium diethyldithiocarbamate, selenium dimethyldithiocarbamate, selenium diethyldithiocarbamate, copper dimethyldithiocarbamate, iron dimethyldithiocarbamate, diethylamine diethyldithiocarbamate, piperidine pentamethylene dithiocarbamate and pipecolin methylpentamethylene dithiocarbamate and xanthate-based vulcanization accelerator such as sodium isopropylxanthate, zinc isopropylxanthate and zinc butylxanthate, and the like.

Any of these may be used alone or in combination of two or more. This component may be present preferably in an amount of 0.5 to 15 parts, especially 1 to 10 parts based on 100 parts of a rubber component.

When a silica is added to a rubber composition of the invention, the wearing resistance and the tan δ of a resultant vulcanizing rubber can further be improved by further adding a silane coupling agent.

The silane coupling agent is not particularly limited, it may be used vinyltrichlorosilane, vinyltriethoxysilane, vinyltris(β-methoxy-ethoxy)silane, β-(3,4-epoxycyclohexyl)-ethyltrimethoxysilane, γ-glycidoxypropyl trimethoxysilane, γ-glycidoxypropylmethyl diethoxysilane, γ-methacryloxypropyl trimethoxysilane, N-(β-aminoethyl)-γ-aminopropyl trimethoxysilane, N-(β-aminoethyl)-γ-aminopropyltrimethyl dimethoxysilane, N-phenyl-γ-aminopropyl trimethoxysilane, γ-chloropropyl trimethoxysilane, γ-mercaptopropyl trimethoxysilane and γ-aminopropyl trimethoxysilane.

Those which can also be employed are bis-[3-(triethoxysilyl)propyl] tetrasulfide, bis-[3-(triethoxysilyl) propyl] disulfide, γ-trimethoxysilylpropyl dimethylthiocarbamyl tetrasulfide, γ-trimethoxysilylpropyl benzothiazyl tetrasulfide, and the like. Any of such silane coupling agents may be used alone or in combination of two or more.

A silane coupling agent is present preferably in an amount of 1 to 20 parts, especially 2 to 15 parts, based on 100 parts of the silica.

A rubber composition according to the invention and a rubber product employing the same can be produced as described below.

First, a rubber component comprising a conjugated diene-based rubber or an oil extended rubber, a silica, a carbon black, a reinforcing agent such as a carbon-silica dual phase filler or the like, a rubber extending oil and other auxiliary components or the like are kneaded using a kneader such as Banbury mixer or the like at a temperature of 70 to 180° C.

Subsequently, the kneaded mixture is cooled and combined with a vulcanizing agent such as a sulfur or the like and a vulcanization accelerator or the like using Banbury mixer, a mixing roll, and the like to mold into a desired shape. A vulcanization at a temperature of 140 to 180° C. is then effected to obtain a desired vulcanized rubber, i.e., a rubber product.

A vulcanized rubber obtained by employing a rubber composition according to the invention has excellent wet skid property, repelling elasticity, and the like together with sufficient wearing resistance, tensile strength, and the like as well as a satisfactory processability, thus being useful as a rubber composition for a tire, especially as a tire tread.

A vulcanized rubber obtained by employing a rubber composition according to the invention has excellent wet skid property, repelling elasticity, and the like together with sufficient wearing resistance, tensile strength, and the like as well as a satisfactory processability, thus being useful as a rubber composition for a tire, especially as a tire tread.

DESCRIPTION OF THE PREFERRED EMBODIMENTS

Figure 1:
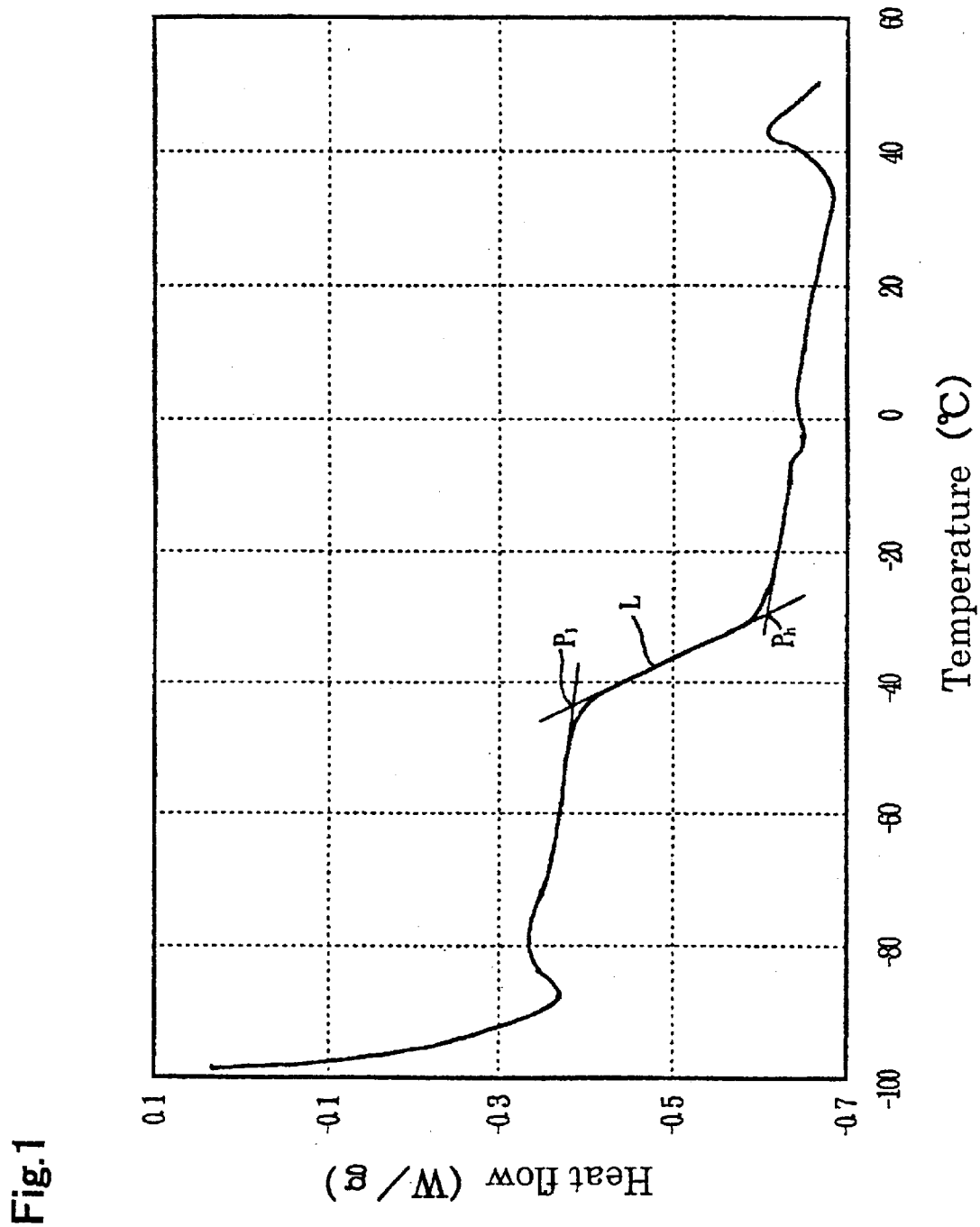
FIG. 1 shows a DSC chart representing the way of obtaining the extrapolated initiation and termination temperature of the glass transition of a conjugated diene-based rubber before being extended with an extending oil in Production Example 1.

The present invention is further described in detail in the following Examples.

[1] Production of Oil Extended Conjugated Diene-based Rubber

PRODUCTION EXAMPLE 1

Oil Extended Conjugated Diene-based Rubber [A]

In a polymerization vessel, 200 parts of water, 4.5 parts of rosin acid soap, 65 parts of butadiene, 26 parts of styrene, 5 parts of acrylonitrile and 1 part of diethylaminoethyl methacrylate were charged. Subsequently, the temperature of the polymerization vessel was set at 5° C., and 0.03 parts of p-menthane hydroperoxide as a radical initiator, 0.02 parts of sodium ethylene diamine tetraacetate, 0.01 parts of ferrous sulfate heptahydrate and 0.03 parts of sodium formaldehyde sulfoxylate were added to the polymerization vessel, whereby initiating the polymerization. Once the conversion reached 30%, additional 3 parts of acrylonitrile was added and then at the conversion reached 60%, diethylhydroxylamine was added to terminate the polymerization. Subsequently, unreacted polymer was recovered by steam stripping, and a conjugated diene-based rubber latex was obtained.

Then 100 parts of the solid contained in this latex was combined with an emulsion containing 37.5 parts of an aromatic oil (FUJIKOSAN, Trade name: "Fucoal Aromax #3"), and then aggregated with sulfuric acid and sodium chloride to obtain crumb. Then the crumb was dried by a hot air blower to obtain a conjugated diene-based rubber [A] extended with an aromatic oil.

The conjugated diene-based rubber ① contained in the latex had the Mooney viscosity of 135, the bound acrylonitrile content of 10% by mass, the bound styrene content of 20% by mass, the bound diethylaminoethyl methacrylate content of 0.6% by mass, the weight-average molecular weight of 640,000, the glass transition point of −42° C. and the difference between the extrapolated temperatures of the initiation and the termination of the glass transition of 11° C. The Mooney viscosity of the oil extended conjugated diene-based rubber [A] was 51.

The extrapolated temperatures of the initiation and the termination of the glass transition were determined by a differential scanning calorimeter (DSC) in accordance with ASTM D3418–82 (reapproved 1988). The extrapolated initiation temperature was the reading on the temperature axis corresponding to the point at which the line extending from the low temperature baseline intersects with the line extending from the almost linear part L between the low temperature inflection point $P_1$ and the high temperature inflection point $P_h$ in the temperature elevation curve of the DSC shown in FIG. 1. The extrapolated termination temperature was the reading on the temperature axis corresponding to the point at which the line extending from the high temperature baseline intersects with the line extending from the linear part L in the temperature elevation curve of the DSC shown in FIG. 1.

PRODUCTION EXAMPLES 2 TO 4

Oil Extended Conjugated Diene-based Rubbers [B] to [D]

A conjugated diene-based rubber latex was obtained similarly to Production Example 1 except for using 2-hydroxyethylmethacrylate, glycidyl methacrylate or methacrylic acid, as shown in Table 1, instead of diethylaminoethyl methacrylate in Production Example 1. The Mooney viscosities of the conjugated diene-based rubbers ② to ④ contained in the latexes were 124 in Production Example 2, 130 in Production Example 3 and 131 in Production Example 4. Thereafter, these latexes were employed to obtain conjugated diene-based rubbers [B] to [D] each of which was extended with an aromatic oil. The monomer bound contents and the mechanical parameters of each rubber are shown also in Table 1.

PRODUCTION EXAMPLE 5

Oil Extended Conjugated Diene-based Rubber [E]

A conjugated diene-based rubber latex was obtained similarly to Production Example 2 except for changing the amount of the raw material consisted of butadiene, styrene and acrylonitrile shown in Table 1. The Mooney viscosity of the conjugated diene-based rubber ⑤ contained in the latexes was 130. Thereafter, this latex was employed to obtain conjugated diene-based rubber [E] extended with an aromatic oil. The monomer bound contents and the mechanical parameter of the rubber are shown also in Table 1.

PRODUCTION EXAMPLE 6

Oil Extended Conjugated Diene-based Rubber [F]

In a polymerization vessel, 200 parts of water, 4.5 parts of rosin acid soap, 58 parts of butadiene and 42 parts of styrene were charged. Subsequently, the temperature of the polymerization vessel was set at 5° C., and 0.03 parts of p-menthane hydroperoxide as a radical initiator, 0.02 parts of sodium ethylene diamine tetraacetate, 0.01 parts of ferrous sulfate heptahydrate and 0.03 parts of sodium formaldehyde sulfoxylate were added to the polymerization vessel, whereby initiating the polymerization. Once the conversion of the polymerization reached 60% diethylhydroxylamine was added to terminate the polymerization. The conjugated diene-based rubber ⑥ contained in the conjugated diene-based rubber latex obtained by the similar procedure had the Mooney viscosity of 124.

Subsequently, conjugated diene-based rubber [F] extended with an aromatic oil was obtained similarly to Production Example 1. The monomer bound contents and the mechanical parameters of this rubber are shown also in Table 1.

PRODUCTION EXAMPLE 7

Oil Extended Conjugated Diene-based Rubber [G]

A conjugated diene-based rubber latex was obtained similarly to Production Example 1 except for not using diethylaminoethyl methacrylate. The conjugated diene-based rubber ⑦ contained in this latex had the Mooney viscosity of 127. Subsequently, conjugated diene-based rubber [G] extended with an aromatic oil was obtained similarly to Production Example 1. The monomer bound contents and the mechanical parameters of this rubber are shown also in Table 1.

re-precipitated from methanol, and this procedure was repeated twice to purify the rubber, which was then dried in vacuum, analyzed by 1H-NMR at 270 MHz.

(d) Bound content of hydroxyl group-containing monomer (% by mass); A rubber was dissolved in toluene and re-precipitated from methanol, and this procedure was repeated twice to purify the rubber, which was then dried in vacuum and analyzed by $^1$H-NMR at 270 MHz.

(e) Bound content of epoxy group-containing monomer (% by mass); A rubber was dissolved in toluene and re-precipitated from methanol, and this procedure was repeated twice to purify the rubber, which was then dried in vacuum and titrated in accordance with Jay's method [R. R. Jay; Anal. Chem., 36, 667 (1964)].

(f) Bound content of carboxyl group-containing monomer (% by mass); A rubber was dissolved in toluene and re-precipitated from methanol, and this procedure was repeated twice to purify the rubber, which was then dried in vacuum, dissolved in chloroform, and then titrated until being neutralized.

(g) Glass transition point; A glass transition point was determined using a differential scanning calorimeter manu-

TABLE 1

| Conjugated diene-based rubber | | ① | ② | ③ | ④ | ⑤ | ⑥ | ⑦ |
|---|---|---|---|---|---|---|---|---|
| Raw material | Butadiene | 65 | 65 | 65 | 65 | 68 | 58 | 66 |
| | Styrene | 26 | 26 | 26 | 26 | 19 | 42 | 26 |
| | Acrylonitrile (initial/addition) | 5/3 | 5/3 | 5/3 | 5/3 | 7/5 | | 5/3 |
| | 2-Diethylaminoethylmethacrylate | 1 | | | | | | |
| | 2-Hydroxyethylmethacrylate | | 1 | | | 1 | | |
| | Glycidyl methacrylate | | | 1 | | | | |
| | Methacrylic acid | | | | 1 | | | |
| Content | Styrene | 20 | 20 | 20 | 20 | 15 | 35 | 20 |
| | Acrylonitrile | 10 | 10 | 10 | 10 | 14 | | 10 |
| | 2-Diethylaminoethylmethacrylate | 0.6 | | | | | | |
| | 2-Hydroxyethylmethacrylate | | 0.7 | | | 0.5 | | |
| | Glycidyl methacrylate | | | 0.5 | | | | |
| | Methacrylic acid | | | | 0.6 | | | |
| Weight-average molecular weight (Mw) | | 640000 | 630000 | 650000 | 620000 | 630000 | 760000 | 660000 |
| Tg (° C.) | | −42 | −41 | −43 | −40 | −44 | −40 | −43 |
| The difference between the extrapolated temperatures of the initiation and the termination of the Tg (° C.) | | 11 | 14 | 12 | 15 | 12 | 7 | 11 |
| Mooney viscosity [$ML_{1+4}$ (100° C.)] | | 135 | 124 | 130 | 131 | 130 | 124 | 127 |
| Mooney viscosity [$ML_{1+4}$ (100° C.)] of the oil extended rubber | | 51 | 47 | 49 | 50 | 50 | 47 | 49 |

The bound contents of acrylonitrile, styrene and a monomer having a functional group such as an amino group, a hydroxyl group, an epoxy group and a carboxyl group in the conjugated diene-based rubbers ① to ⑦ were determined as described in (a) to (f) and the respective mechanical parameters were determined as described in (g) to (i) below. Mooney viscosity of the oil extended conjugated diene-based rubbers [A] to [G] were also determined as described in (h) below.

(a) Bound acrylonitrile content (% by mass); A rubber was dissolved in toluene and re-precipitated from methanol, and this procedure was repeated twice to purify the rubber, which was then dried in vacuum, subjected to an elemental analysis to obtain a nitrogen content, from which the bound content was calculated.

(b) Bound styrene content (% by mass); A rubber was dissolved in toluene and re-precipitated from methanol, and this procedure was repeated twice to purify the rubber, which was then dried in vacuum, subjected to an infrared absorption spectroscopy to obtain a calibration curve, from which the bound content was obtained.

(c) Bound content of amino group-containing monomer (% by mass); A rubber was dissolved in toluene and factured by SEIKO DENSI KOGYO in accordance with ASTM D3418–82 (reapproved 1988). The glass transition point was the extrapolated temperatures of the initiation of the glass transition.

(h) Mooney viscosity [$ML_{1+4}$ (100° C.)]; A measurement was in accordance with JIS K 6300–1994 at 100° C. with the preliminary heating for 1 minute and the measuring period of 4 minutes.

(i) Weight-average molecular weight (Mw); A GPC (gel permeation chromatography) was employed and represented as a standard polystyrene.

[2] Preparation of Rubber Compositions and Vulcanized Rubbers

Each of the oil extended conjugated diene-based rubbers [A] to [G] of Production Examples 1 to 7 was employed together with the respective composition shown in Table 2 and Table 3 and kneaded by LABOPLASTOMILL (TOYOSEIKI Co., Ltd.) to obtain the rubber compositions of Examples 1 to 8 shown in Table 2 and Comparatives 1 to 6 shown in Table 3. After vulcanizing by a vulcanization press at 160° C. for 20 minutes, the vulcanized rubbers of Examples 1 to 8 and Comparatives 1 to 6 were obtained.

Each of these rubber compositions of Examples and Comparatives was examined for the processability, the Mooney viscosity and the mechanical parameters of the respective vulcanized rubber. The results are shown also in Table 2 and Table 3.

The components incorporated in the formulations described above were as follows.

① Silica; NIPPON SILICA INDUSTRIAL Co., Ltd., Trade name: "NIPSIL AQ"
② Silane coupling agent; DEGUSA HULS, Trade name: "Si69"
③ Anti-aging agent; OUCHISHINKO CHEMICAL INDUSTRIAL CO., LTD., Trade name: "NOCRAC 81ONA"
④ Vulcanization accelerator (I); OUCHISHINKO CHEMICAL INDUSTRIAL CO., LTD., Trade name: "NOCCELER CZ"
⑤ Vulcanization accelerator (II); OUCHISHINKO CHEMICAL INDUSTRIAL CO., LTD., Trade name: "NOCCELER D"

The mechanical characteristics or the like were determined as described in (a) to (e) below. The Mooney viscosity of the rubber composition was determined similarly to the oil extended conjugated diene-based rubber.

(a) Processability; A rubber composition was evaluated based on its winding around a roll upon kneaded using the roll. The evaluation criteria are shown below.

○: Excellent with no separation form roll surface. Δ: Winding possible with slight separation. ×: Extremely poor with almost no winding.

(b) Tensile characteristics: In accordance with JIS K 6301–1995 using a type 3 test piece, the elongation at break and the tensile strength were determined at 25° C. and the tensile speed of 500 mm/min.

(c) Repelling elasticity; A repelling elasticity was determined using DUNLOP TRIPHTHOMETER at 50° C.

(d) tan δ; A tan δ was determined using a dynamic analyzer (RDA) manufactured by RHEOMETRIX in United States at the dynamic strain of 3%, the frequency of 10 Hz and the temperatures of 0° C. and 50° C. A larger value at 0° C. reflects a higher wet skid resistance as a preferable property. A smaller value at 50° C. reflects a smaller rolling resistance as a preferable property.

(e) Lambourn wear Index; A wearing level was calculated at the slip rate of 60% using a Lambourn wear tester. The measurement was made at 50° C. A higher Index reflects a better wearing resistance.

TABLE 2

| | | | Example | | | | | | | |
|---|---|---|---|---|---|---|---|---|---|---|
| | | | 1 | 2 | 3 | 4 | 5 | 6 | 7 | 8 |
| Rubber component | Conjugated diene-based rubber ① | | 100 | | | | | | | 100 |
| | Conjugated diene-based rubber ② | | | 100 | 100 | 100 | | | | |
| | Conjugated diene-based rubber ③ | | | | | | 100 | | | |
| | Conjugated diene-based rubber ④ | | | | | | | 100 | | |
| | Conjugated diene-based rubber ⑤ | | | | | | | | 100 | |
| Aromatic oil added to rubber component | | | 37.5 | 37.5 | 37.5 | 37.5 | 37.5 | 37.5 | 37.5 | 37.5 |
| Silica | | | 60 | 60 | 60 | 60 | 60 | 60 | 60 | 70 |
| Carbon black | | | 10 | 10 | 10 | 10 | 10 | 10 | 10 | 0 |
| Silane coupling agent | | | 6 | 6 | 3 | 0 | 6 | 6 | 6 | 6 |
| Zinc oxide | | | 3 | 3 | 3 | 3 | 3 | 3 | 3 | 3 |
| Stearic acid | | | 2 | 2 | 2 | 2 | 2 | 2 | 2 | 2 |
| Anti-aging agent | | | 1 | 1 | 1 | 1 | 1 | 1 | 1 | 1 |
| Sulfur | | | 1.5 | 1.5 | 2.2 | 4.5 | 1.5 | 1.5 | 1.5 | 1.5 |
| Vulcanization accelerator | (I) | | 1.5 | 1.5 | 1.5 | 1.5 | 1.5 | 1.5 | 1.5 | 1.5 |
| | (II) | | 1 | 1 | 1 | 1 | 1 | 1 | 1 | 1 |
| Processability | | | ○ | ○ | Δ | Δ | ○ | ○ | ○ | ○ |
| Mooney viscosity [$ML_{1+4}$ (100° C.)] | | | 72 | 74 | 98 | 112 | 78 | 75 | 79 | 75 |
| Elongation (%) | | | 730 | 710 | 670 | 550 | 700 | 710 | 700 | 700 |
| Tensile strength (MPa) | | | 27 | 26 | 26 | 23 | 25 | 25 | 28 | 27 |
| Impact resilience (%) | | | 53 | 54 | 52 | 54 | 50 | 52 | 54 | 55 |
| 3% tan δ | 0° C. | | 0.350 | 0.371 | 0.390 | 0.450 | 0.360 | 0.357 | 0.382 | 0.351 |
| | 50° C. | | 0.120 | 0.123 | 0.115 | 0.110 | 0.127 | 0.125 | 0.122 | 0.115 |
| Lambourn wear Index | | | 117 | 125 | 110 | 99 | 120 | 119 | 127 | 114 |

TABLE 3

| | | | Comparative example | | | | | |
|---|---|---|---|---|---|---|---|---|
| | | | 1 | 2 | 3 | 4 | 5 | 6 |
| Rubber component | Conjugated diene-based rubber ⑥ | | 100 | 100 | 100 | | | |
| | Conjugated diene-based rubber ⑦ | | | | | 100 | 100 | 100 |
| Aromatic oil added to rubber component | | | 37.5 | 37.5 | 37.5 | 37.5 | 37.5 | 37.5 |
| Silica | | | 60 | 60 | 60 | 60 | 60 | 60 |
| Carbon black | | | 10 | 10 | 10 | 10 | 10 | 10 |
| Silane coupling agent | | | 6 | 3 | 0 | 6 | 3 | 0 |
| Zinc oxide | | | 3 | 3 | 3 | 3 | 3 | 3 |
| Stearic acid | | | 2 | 2 | 2 | 2 | 2 | 2 |
| Anti-aging agent | | | 1 | 1 | 1 | 1 | 1 | 1 |
| Sulfur | | | 1.5 | 2.2 | 4.5 | 1.5 | 2.2 | 2.2 |
| Vulcanization accelerator | (I) | | 1.5 | 1.5 | 1.5 | 1.5 | 1.5 | 1.5 |
| | (II) | | 1 | 1 | 1 | 1 | 1 | 1 |

TABLE 3-continued

|  | Comparative example | | | | | |
| --- | --- | --- | --- | --- | --- | --- |
|  | 1 | 2 | 3 | 4 | 5 | 6 |
| Processability | Δ | Δ | X | ◯ | ◯ | ◯ |
| Mooney viscosity [$ML_{1+4}$ (100° C.)] | 77 | 92 | 125 | 75 | 86 | 110 |
| Elongation (%) | 700 | 740 | 530 | 750 | 790 | 610 |
| Tensile strength (MPa) | 26 | 26 | 18 | 28 | 28 | 24 |
| Impact resilience (%) | 50 | 51 | 51 | 50 | 49 | 49 |
| 3% tanδ  0° C. | 0.288 | 0.271 | 0.335 | 0.314 | 0.301 | 0.295 |
| 50° C. | 0.142 | 0.130 | 0.107 | 0.140 | 0.130 | 0.119 |
| Lambourn wear Index | 100 | 83 | 67 | 120 | 110 | 93 |

The Mooney viscosity in Table 1 was the value of a rubber composition after incorporating an inorganic filler and other additives.

Based on the results shown in Table 2, any of the rubber compositions of Examples 1 to 8 exhibited an excellent processability and gave a vulcanized rubber whose mechanical characteristics were satisfactory. As a result of a large tan δ at 0° C. and a small tan δ at 50° C., a tire having a high wet skid resistance and a low rolling resistance is expected to be obtained. In addition, the Lambourn wear Index is sufficiently high, indicating that a vulcanized rubber having an excellent wearing resistance can be obtained. In each of Examples 3 and 4 where a reduced amounts of the silane coupling agent was added, the increase in the Mooney viscosity was limited to a small extent and a tensile strength and a wearing resistance which were equivalent to those in other Examples were obtained, indicating that a rubber composition and a vulcanized rubber having excellent performances were obtained even when a reduced amount of the silane coupling agent was employed.

On the other hand, based on the results shown in Table 3, each of the rubber compositions of Comparatives 1 to 3 employing the oil extended conjugated diene-based rubber [F] which had been produced using neither of acrylonitrile nor a monomer having certain functional groups exhibited a markedly deteriorated processability due to the reduced amount of the silane coupling agent, as well as an insufficiently improved tanб of the respective vulcanized rubber at 0° C. and a Lambourn wear Index which was extremely low especially when no silane coupling agent was contained.

Furthermore, a vulcanized rubber obtained from each of the rubber compositions of Comparatives 4 and 5 employing the oil extended conjugated diene-based rubber [G], which had been produced using no monomer having certain functional groups, and containing a silane coupling agent exhibited a smaller tan δ at 0° C. when compared with Examples and a somewhat poorer wet skid resistance. Comparative 6 employing the oil extended conjugated diene-based rubber [G] and containing no silane coupling agent had a slightly smaller tan δ at 0° C. and a somewhat poorer wearing resistance. Each of the rubber compositions of Comparatives 4 to 6 and the vulcanized rubbers made therefrom exhibited a mechanical property or the like which was poorer than that of any Example but was better than those of Comparatives 1 to 3.

What is claimed is:

1. A conjugated diene-based rubber being characterized in having a repeating unit comprising ① 1 to 30% by mass of an olefinically unsaturated nitrile monomer unit, ② 10 to 50% by mass of an aromatic vinyl monomer unit ③ 19.9 to 88.9% by mass of a conjugated diene monomer unit and ④ 0.1 to 10% by mass of a monomer unit having one polymerizable unsaturated group and at least one functional group selected from the group consisting of an amino group, a hydroxy group, an epoxy group, a carboxyl group and an alkoxysilyl group [where the total of ①, ②, ③ and ④ is 100% by mass], and whose Mooney viscosity [$ML_{1+4}$ (100° C.)] is 20 to 200.

2. A conjugated diene-based rubber according to claim 1 wherein, the glass transition point of said conjugated diene-based rubber is −60 to 0° C., and the difference between the extrapolated temperatures of the initiation and the termination of said glass transition is 20° C. or less.

3. A conjugated diene-base rubber according to claim 2 wherein,
a monomer forming said olefinically unsaturated nitrile monomer unit is at least one selected from the group consisting of acrylonitrile and methacrylonitrile;
a monomer forming said aromatic vinyl monomer unit is at least one selected from the group consisting of styrene, 2-methylstyrene, 3-methylstyrene, 4-methylstyrene, α-methylstyrene, 2,4-dimethylstyrene, 2,4-diisopropylstyrene, 4-tert-butylstyrene and tert-butoxystyrene;
a monomer forming said conjugated diene monomer unit is at least one selected from the group consisting of 1,3-butadiene, isoprene, 2,3-dimethyl-1,3-butadiene and chloroprene.

4. An oil extended rubber being characterized in comprising 100 parts by mass of a conjugated diene-based rubber which has a repeating unit comprising ① 1 to 30% by mass of an olefinically unsaturated nitrile monomer unit, ② 10 to 50% by mass of an aromatic vinyl monomer unit ③ 19.9 to 88.9% by mass of a conjugated diene monomer unit and ④ 0.1 to 10% by mass of a monomer unit having one polymerizable unsaturated group and at least one functional group selected from the group consisting of an amino group, a hydroxy group, an epoxy group, a carboxyl group and an alkoxysilyl group [where the total of ①, ②, ③ and ④ is 100% by mass], and whose Mooney viscosity [$ML_{1+4}$ (100° C.)] is 40 to 200, and 10 to 60 parts by mass of an extending oil.

5. An oil extended rubber according to claim 4 wherein, the glass transition point of said conjugated diene-based rubber is −60 to 0° C., and the difference between the extrapolated temperatures of the initiation and the termination of said glass transition is 20° C. or less.

6. An oil extended rubber according to claim 5 wherein,
a monomer forming said olefinically unsaturated nitrile monomer unit is at least one selected from the group consisting of acrylonitrile and methacrylonitrile;
a monomer forming said aromatic vinyl monomer unit is at least one selected from the group consisting of styrene, 2-methylstyrene, 3-methylstyrene, 4-methylstyrene, α-methylstyrene, 2,4- dimethylstyrene, 2,4-diisopropylstyrene, 4-tert-butylstyrene and tert-butoxystyrene;

a monomer forming said conjugated diene monomer unit is at least one selected from the group consisting of 1,3-butadiene, isoprene, 2,3-dimethyl-1,3-butadiene and chloroprene.

7. An oil extended rubber according to claim 6 wherein, said extending oil is at least one selected from the group consisting of an aromatic-based oil, a naphthene-based oil and a paraffin-based oil.

8. A rubber composition being characterized in comprising 100 parts by mass of a conjugated diene-based rubber which has a repeating unit comprising ① 1 to 30% by mass of an olefinically unsaturated nitrile monomer unit, ② 10 to 50% by mass of an aromatic vinyl monomer unit ③ 19.9 to 88.9% by mass of a conjugated diene monomer unit and ④ 0.1 to 10% by mass of a monomer unit having one polymerizable unsaturated group and at least one functional group selected from the group consisting of an amino group, a hydroxy group, an epoxy group, a carboxyl group and an alkoxysilyl group [where the total of ①, ②, ③ and ④ is 100% by mass], and whose Mooney viscosity [$ML_{1+4}$ (100° C.)) is 20 to 200, and 10 to 150 parts by mass of an inorganic filler.

9. A rubber composition according to claim 8 wherein, the glass transition point of said conjugated diene-based rubber is −60 to 0° C., and the difference between the extrapolated temperatures of the initiation and the termination of said glass transition is 20° C. or less.

10. A rubber composition according to claim 9 wherein,
a monomer forming said olefinically unsaturated nitrile monomer unit is at least one selected from the group consisting of acrylonitrile and methacrylonitrile;
a monomer forming said aromatic vinyl monomer unit is at least one selected from the group consisting of styrene, 2-methylstyrene, 3-methylstyrene, 4-methylstyrene, α-methylstyrene, 2,4-dimethylstyrene, 2,4-diisopropylstyrene, 4-tert-butoxystyrene and tert-butoxystyrene;
a monomer forming said conjugated diene monomer unit is at least one selected from the group consisting of 1,3-butadiene, isoprene, 2,3-dimethyl-1,3-butadiene and chloroprene.

11. A rubber composition according to claim 10 wherein said inorganic filler is a silica.

12. A rubber composition according to claim 11 further comprising a carbonblack.

13. A rubber composition according to claim 11 or 12 further comprising a silane coupling agent.

14. A rubber composition according to claim 8 further comprising 10 to 60 parts by mass of an extending oil based on 100 parts by mass of said conjugated diene-based rubber and the Mooney viscosity [$ML_{1+4}$ (100° C.)] of said conjugated diene-based rubber is 40 to 200.

15. A rubber composition according to claim 14 wherein, the glass transition point of said conjugated diene-based rubber is −60 to 0° C., and the difference between the extrapolated temperatures of the initiation and the termination of said glass transition is 20° C. or less.

16. A rubber composition according to claim 15 wherein,
a monomer forming said olefinically unsaturated nitrile monomer unit is at least one selected from the group consisting of acrylonitrile and methacrylonitrile;
a monomer forming said aromatic vinyl monomer unit is at least one selected from the group consisting of styrene, 2-methylstyrene, 3-methylstyrene, 4-methylstyrene, a methylstyrene, 2,4-dimethylstyrene, 2,4-diisopropylstyrene, 4-tert-butylstyrene and tert-butoxystyrene;

a monomer forming said conjugated diene monomer unit is at least one selected from the group consisting of 1,3-butadiene, isoprene, 2,3-dimethyl-1,3-butadiene and chloroprene.

17. A rubber composition according to claim 16 wherein, said extending oil is at least one selected from the group consisting of an aromatic-based oil, a naphthene-based oil and a paraffin-based oil.

18. A rubber composition according to claim 17 wherein said inorganic filler is a silica.

19. A rubber composition according to claim 18 further comprising a carbonblack.

20. A rubber composition according to claim 18 or 19 further comprising a silane coupling agent.

* * * * *